2,767,166

PROCESS FOR THE PREPARATION OF CHROMED AZO DYES DERIVED FROM AN ANISIDINE

Albert F. Strobel, Phillipsburg, N. J., and William W. Williams, Easton, Pa., assignors to General Aniline & Film Corporation, New York, N. Y., a corporation of Delaware No Drawing. Application January 31, 1952, Serial No. 269,325

6 Claims. (Cl. 260—147)

This invention relates to a process for preparing a chromed azo dye by reacting an essentially anhydrous solution of chromium formate in formamide with an azo dye derived from an o-anisidine compound and a coupling component having a metallizable group ortho to the azo linkage.

Chromed monoazo dyes are known, and may be prepared from ortho, ortho' dihydroxy azo compounds; e. g. by reaction with chromium chloride in an aqueous medium. However, attempts to carry out this chroming reaction with an ortho-methoxy, ortho'-amino monoazo dye were unsuccessful, resulting in decomposition and complete decolorization of the dye.

Certain highly desirable monoazo dyes are subject to the disadvantages of being prepared from ortho-amino phenol intermediates which in turn are difficult to prepare and expensive to manufacture. The art is confronted with the problem of providing a process for preparing these desirable dyes in a commercially more interesting manner.

It has been found in accordance with the invention that the above-mentioned dyes may be prepared at substantially reduced cost and in a more convenient manner from the appropriate anisidine intermediate. After the dye is formed, it is chromed by treatment with an essentially anhydrous solution of a trivalent chromium salt in a lower acylamide, such as acetamide or formamide.

The objects achieved in accordance with the invention as described herein include the provision of a commercially interesting process for chroming an azo dye derived from an o-anisidine compound and a coupling component having a metallizable radical ortho to the azo linkage; the provision of a process for reacting chromium formate in substantially anhydrous formamide with such an anisidine derived dye; and other objects which will be apparent as details or embodiments are set forth hereinafter.

In order to facilitate a clear understanding of the invention, the following preferred specific embodiments are described in detail:

EXAMPLE 1

A. *Diazotization and coupling*

There is dissolved 84.1 parts 5-nitro-2-aminoanisole in a mixture of 250 parts hydrochloric acid (sp. gr.=1.19) and 630 parts water by heating to the boil. After cooling rapidly to 10° C., there is added 200 parts ice (some precipitate present), and under the surface, 37.1 parts sodium nitrate (as about 30% aqueous solution). The mixture is stirred rapidly for 20 minutes. A small amount of undissolved material is removed and excess nitrite is decomposed by adding 0.5 part 10% aqueous sulfamic acid.

In the meantime a coupler solution is prepared as follows: 91.5 parts 1-phenyl-3-methyl-5-pyrazolone is dissolved in 300 parts water and 79 parts 40% aqueous sodium hydroxide by warming on a steam bath. Then it is cooled to 20° C., and treated with 47 parts 10% aqueous sodium bicarbonate. This solution is added to the above cold diazo, followed by 565 parts 25% aqueous sodium acetate added over a period of ½ hour. After this period the test for free diazo is negative. The final pH is 3. The material is stirred for 3 hours, then filtered. The presscake is dried at 75–85° C. in an air oven (dry weight=177 parts) and then hammer-milled.

B. *Chroming*

31.7 parts chromium formate paste (10.23% chromium by weight) is slurried with 141 parts formamide (99%) until homogeneous, and heated one hour at 165–170° C. under a current of nitrogen. To it is added over a 2½ hour period 43.8 parts of the hammer-milled dye prepared above, through a funnel and adding tube, followed by washing the latter with about 56 parts formamide and adding the washings to the reaction mixture. Then the material is heated at 165–170° C. for 6 hours, cooled to 95° C., and treated with 83 parts 40% aqueous sodium hydroxide, stirred for one hour at 100° C., and poured into 800 parts water. The dye slurry is stirred for about 2 hours, filtered, and dried in vacuum oven at 70° C. (dry weight: 46 parts). This reaction is illustrated by the following:

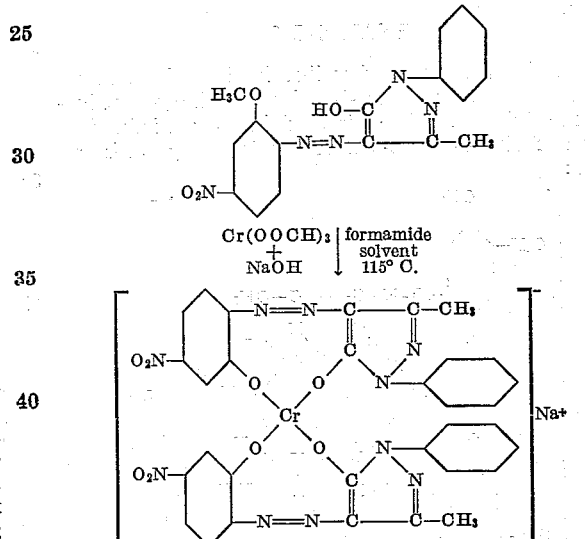

In this procedure, the desired reaction temperature is in the range of 150 to 170° C. Below about 150° C. the reaction is so slow that the addition of the unmetallized dye must be very slow, and above about 175° C., rapid decomposition of the dye takes place. The amount of formamide used is the minimum amount which provides sufficient fluidity to permit good agitation of the reaction mixture.

EXAMPLE 2

57.5 parts of chromium formate paste containing 12.66% chromium is slurried with 113 parts of formamide, then transferred to a relatively large distilling vessel, connected with a trap cooled in Dry Ice-ethanol. The chromium formate slurry is slowly heated to 69° C., and at 55° C. the pressure is reduced to 24 mm. Hg. The vapor temperature rises from 41° to 57° C. and 31.5 parts of distillate is collected in the trap. This chromium formate solution in formamide is transferred to a relatively large vessel and diluted with 56 parts of formamide. The mixture is heated to 65° C. and to it is added through a long stem powder funnel 52.8 parts of base dye 5-nitro-2-amino-anisole→2-naphthylamine-5-sulfonic acid 56 parts more of formamide is then added as washings from the funnel and both containers. The material is heated at 135–140° C. for 12½ hours under reflux, then cooled to room temperature overnight, diluted with 750 parts of water, and treated with 72 parts of 40% NaOH. It is then treated with 50 parts of sodium chloride, stirred overnight, filtered and the presscake dried at 85° C. in a vacuum oven. The dye so prepared dyes fully equal to the dye obtained by chromining the base dye:

5-nitro-2-aminophenol→2-naphthylamine-5-sufonic acid

This reaction is illustrated by the following:

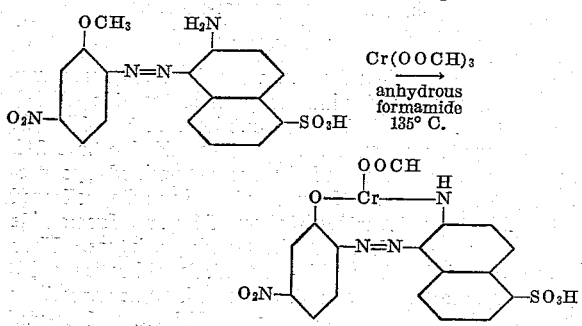

In this procedure, the desired reaction temperature is in the range of 130 to 155° C. At temperatures below about 130° C., no appreciable reaction occurs, and at temperatures above about 155° C., decomposition of the dye takes place.

EXAMPLE 3

Following the process described in Example 1, except that 91.1 parts of 6-nitro-3-amino-4-methoxy-1-methyl-benzene (nitro cresidine) is used in place of the 84.1 parts of 5-nitro-2-amino-anisole, the following dye is prepared:

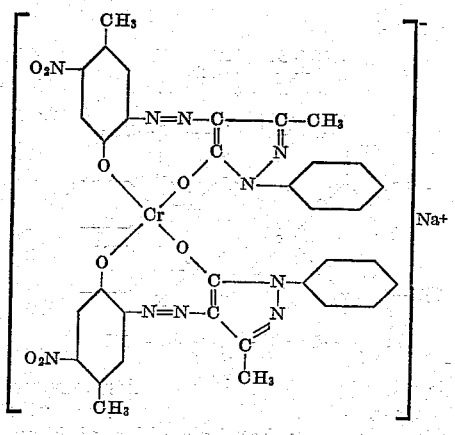

EXAMPLE 4

Following the process described in Example 1, except that 68.6 parts of 4-methyl-2-amino-anisole is used in place of 84.1 parts of 5-nitro-2-amino-anisole, the following dye is prepared:

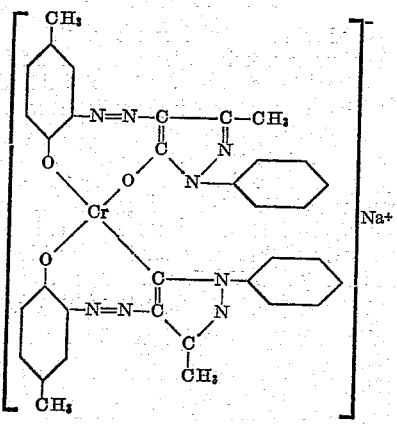

Comparable results are obtained using a chromium salt of a lower carboxylic acid, such as chromium acetate, dissolved in a lower carboxylic acid amide such as acetamide; however, for economic reasons, the above-described solution of chromium formate in formamide is preferred. Furthermore, for economic reasons, it is preferred to use the minimum amount of formamide compatible with sufficient fluidity to permit good agitation of the reaction mixture.

The reaction system should be essentially anhydrous, and wherein the appended claims the term "essentially anhydrous" is employed, there is meant a system containing below about 5% water, and preferably below about 2% water; inasmuch as it has been found that 5 to 10% water in the formamide interferes with the formation of the chrome complex and also results in decomposition of the dye.

In the broader aspects of the invention dyestuffs of the following general formulae may be prepared in accordance with the above procedures, using the appropriate or corresponding intermediates:

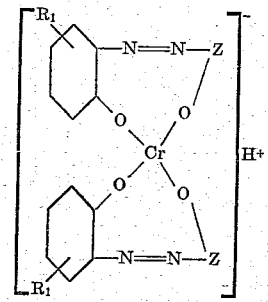

and

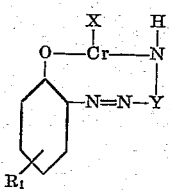

wherein X is an anion such as Cl$^-$, Br$^-$, HCOO$^-$, H$_3$CCOO$^-$, and the like, each R$_1$ is the same or a different substituent such as —NO$_2$, —Cl, —Br, —CN, alkoxy, an alkyl group such as —CH$_3$, —C$_2$H$_5$, Z is a phenol, naphthol, or enolizable keto residue, and Y is a naphthylamine or monoalkyl naphthylamine residue or radical.

It is indeed surprising that these reactions may be carried out in a solvent such as acetamide or formamide, inasmuch as such a reaction was found not to take place in tests with other high boiling solvents such as nitrobenzene, dichloro benzene, xylene, ethylene glycol, glycerine, and the like.

Variations and modifications of the invention will be apparent to one skilled in the art in view of the foregoing disclosures, and it is intended to include within the invention all such modifications and variations except as do not come within the scope of the appended claims.

We claim:

1. In a process for the chromation of metallizable azo dyestuffs, derived from a diazotized o-anisidine compound and a coupling component selected from the group consisting of 1-phenyl-3-methyl-5-pyrazolone and 2-naphthylamine-5-sulfonic acid, by reaction of said azo dye with a trivalent chromium salt in an inert organic solvent, and at an elevated temperature which is below the decomposition temperature of the said dyestuff; the improvement which comprises effecting said reaction of said azo dye with said chromium salt, by adding said azo dye to an essentially anhydrous solution of said trivalent chromium salt in a lower carboxylic acid amide, and heating the same until the chromation is essentially complete, and thereafter recovering the thus-obtained chromed azo dye.

2. The process of claim 1, wherein the amide is formamide.

3. The process of claim 2, wherein the anisidine compound is 5-nitro-2-amino-anisole, and the coupling component is 1-phenyl-3-methyl-5-pyrazolone and the reaction temperature is in the range of 150 to 170° C.

4. The process of claim 2, wherein the anisidine compound is 4-nitro-3-methyl-2-amino-anisole, and the coupling component is 1-phenyl-3-methyl-5-pyrazolone and the reaction temperature is in the range of 150 to 170° C.

5. The process of claim 2, wherein the anisidine compound is 4-methyl-2-amino-anisole, and the coupling component is 1-phenyl-3-methyl-5-pyrazolone and the reaction temperature is in the range of 150 to 170° C.

6. The process of claim 2, wherein the anisidine compound is 4-methyl-2-amino-anisole, and the coupling component is 3-naphthylamine-5-sulfonic acid and the reaction temperature is in the range of 130 to 155° C.

References Cited in the file of this patent

UNITED STATES PATENTS 2,230,686   Holzback et al. _____ Feb. 4, 1941